US008706287B2

(12) United States Patent
Gocht et al.

(10) Patent No.: US 8,706,287 B2
(45) Date of Patent: Apr. 22, 2014

(54) CONTROL SYSTEM FOR A MILL AND METHOD FOR OPERATING A MILL

(75) Inventors: Dietmar Gocht, Duisburg (DE); Werner Bischoff, Oberhausen (DE); Thomas Krause, Oberhausen (DE); Alfred Gwosdz, Muelheim (DE)

(73) Assignee: Steag Energy Services GmbH, Essen (DE)

( * ) Notice: Subject to any disclaimer, the term of this patent is extended or adjusted under 35 U.S.C. 154(b) by 272 days.

(21) Appl. No.: 12/809,651

(22) PCT Filed: Dec. 6, 2008

(86) PCT No.: PCT/EP2008/010365

§ 371 (c)(1),
(2), (4) Date: Oct. 1, 2010

(87) PCT Pub. No.: WO2009/083096

PCT Pub. Date: Jul. 9, 2009

(65) Prior Publication Data

US 2011/0015776 A1 Jan. 20, 2011

(30) Foreign Application Priority Data

Dec. 21, 2007 (DE) ......................... 10 2007 062 820

(51) Int. Cl.
*G05B 13/00* (2006.01)

(52) U.S. Cl.
USPC ........... 700/164; 700/173; 110/344; 318/611; 241/34

(58) Field of Classification Search
USPC ................... 700/164, 173; 110/344; 318/611; 241/34
See application file for complete search history.

(56) References Cited

U.S. PATENT DOCUMENTS

| | | | | |
|---|---|---|---|---|
| 4,184,640 A * | 1/1980 | Williams | ........................ | 241/34 |
| 5,519,298 A * | 5/1996 | Fukuhara et al. | ............. | 318/611 |

FOREIGN PATENT DOCUMENTS

| | | |
|---|---|---|
| DE | 420207 | 10/1925 |
| DE | 4129898 | 3/1993 |
| DE | 4444794 | 6/1995 |
| JP | 02122848 | 5/1990 |
| JP | 07116531 | 5/1995 |
| JP | 07116531 | * 9/1995 |
| JP | 09000958 | 1/1997 |
| JP | 09-122518 | 5/1997 |
| JP | 09-141116 | 6/1997 |

OTHER PUBLICATIONS

Ogata, et al. "Application of Fuzzy Control to Upright Roller Mills for Crushing Cement Stock," Fuji Newsletter, Oct. 10, 1990, vol. 63, No. 10.

* cited by examiner

*Primary Examiner* — Tejal Gami
(74) *Attorney, Agent, or Firm* — Occhiuti & Rohlicek LLP

(57) ABSTRACT

The invention related to a control system for a mill, particularly a roller grinding mill, comprising a mill control device (11), which is designed to control at least one mill characteristic on the basis of an associated target variable, and a fuzzy-control device (13), which is connected to the mill control device (11) and designed to adjust the target variable of the at least one mill characteristic to be controlled when at least one operating parameter of the mill deviates from a predefined normal range as a function of fuzzy rules that are based on said at least one operating parameter of the mill until the at least one operating parameter of the mill has reached the predefined normal range again. A solution is to be provided, which enables automated optimized mill operation even with changing operating conditions, particularly a mill operation that prevents the "mill rumbling". This is achieved in that the at least one operating parameter of the mill encompasses as least the air pressure difference over the mill.

22 Claims, 11 Drawing Sheets dpback_dt = rate of change of the backpressure
mBr = fuel mass flow
Nel = electrical power, mill
nsift = sifter rotation speed
pair = air pressure upstream of the mill
water = water content from grinding drying calculation pgrinding = grinding pressure
Hardgr = Hardgrove number

| WHEN | | | | | | | THEN | | |
|---|---|---|---|---|---|---|---|---|---|
| dpback_dt | mBr | Nel | nsift | pair | water | DoS | Hardgr | DoS | pgrinding |
| high | low | low | medium | medium | medium | 1.00 | low | 1.00 | low |
| medium | medium | low | medium | medium | medium | 1.00 | low | 1.00 | medium |
| low | high | low | medium | medium | medium | 1.00 | low | 1.00 | high |
| high | low | medium | medium | medium | medium | 1.00 | medium | 1.00 | low |
| medium | medium | medium | medium | medium | medium | 1.00 | medium | 1.00 | medium |
| low | high | medium | medium | medium | medium | 1.00 | medium | 1.00 | high |
| high | low | high | medium | medium | medium | 1.00 | high | 1.00 | low |
| medium | medium | high | medium | medium | medium | 1.00 | high | 1.00 | medium |
| low | high | high | medium | medium | medium | 1.00 | high | 1.00 | high |

FIG. 4

| # | WHEN | | | THEN | | THEN | |
|---|---|---|---|---|---|---|---|
| | dp_air_mill | p_grinding | U_sift | DoS | dp_grinding_dt | DoS | dU_sift_dt |
| 1 | negative | negative | fine | 1.00 | reduce | 0.40 | finer |
| 2 | negative | normal | fine | 1.00 | reduce | 0.40 | finer |
| 3 | negative | positive | fine | 1.00 | reduce | 0.40 | finer |
| 4 | normal | negative | fine | 1.00 | zero | 1.00 | zero |
| 5 | normal | normal | fine | 1.00 | zero | 1.00 | zero |
| 6 | normal | positive | fine | 1.00 | zero | 1.00 | zero |
| 7 | positive | negative | fine | 1.00 | increase | 0.40 | coarser |
| 8 | positive | normal | fine | 1.00 | increase | 0.40 | coarser |
| 9 | positive | positive | fine | 1.00 | increase | 0.40 | coarser |
| 10 | negative | negative | normal | 1.00 | reduce | 0.40 | finer |
| 11 | negative | normal | normal | 1.00 | reduce | 0.40 | finer |
| 12 | negative | positive | normal | 1.00 | reduce | 0.40 | finer |
| 13 | normal | negative | normal | 1.00 | zero | 1.00 | zero |
| 14 | normal | normal | normal | 1.00 | zero | 1.00 | zero |
| 15 | normal | positive | normal | 1.00 | zero | 1.00 | zero |
| 16 | positive | negative | normal | 1.00 | increase | 0.40 | coarser |
| 17 | positive | normal | normal | 1.00 | increase | 0.40 | coarser |
| 18 | positive | positive | normal | 1.00 | increase | 0.40 | coarser |
| 19 | negative | negative | coarse | 1.00 | reduce | 0.40 | finer |
| 20 | negative | normal | coarse | 1.00 | reduce | 0.40 | finer |
| 21 | negative | positive | coarse | 1.00 | reduce | 0.40 | finer |
| 22 | normal | negative | coarse | 1.00 | zero | 1.00 | zero |
| 23 | normal | normal | coarse | 1.00 | zero | 1.00 | zero |
| 24 | normal | positive | coarse | 1.00 | zero | 1.00 | zero |
| 25 | positive | negative | coarse | 1.00 | increase | 0.40 | coarser |
| 26 | positive | normal | coarse | 1.00 | increase | 0.40 | coarser |
| 27 | positive | positive | coarse | 1.00 | increase | 0.40 | coarser |
| | | | | | | | |
| | | | | | | | |

FIG. 6

| No. | **WHEN** grinding pressure$_{(load)}$ | **AND** dp air$_{(load)}$ | **AND** Rotation speed$_{(load)}$ | | **THEN** HGI |
|---|---|---|---|---|---|
| 1 | high | high | normal | | very much less than $HGI_{(design)}$ |
| 2 | normal | high | normal | | much less than $HGI_{(design)}$ |
| 3 | low | high | normal | | lower than $HGI_{(design)}$ |
| 4 | high | normal | normal | | somewhat lower than $HGI_{(design)}$ |
| 5 | normal | normal | normal | | $HGI_{(design)}$ |
| 6 | low | normal | normal | | somewhat higher than $HGI_{(design)}$ |
| 7 | high | low | normal | | higher than $HGI_{(design)}$ |
| 8 | normal | low | normal | | much higher than $HGI_{(design)}$ |
| 9 | low | low | normal | | very much higher than $HGI_{(design)}$ |

FIG. 11

CONTROL SYSTEM FOR A MILL AND METHOD FOR OPERATING A MILL

CROSS-REFERENCE TO RELATED APPLICATIONS

This application is the National Stage of International Application No. PCT/EP2008/010365, filed on Dec. 6, 2008, which claims the priority of German Application No. 102007062820.1, filed on Dec. 21, 2007. The contents of both applications are hereby incorporated by reference in their entirety.

FIELD OF DISCLOSURE

The invention relates to a mill control system, in particular a rolling mill, having: a mill control apparatus which is designed to control at least one mill characteristic variable on the basis of an associated nominal variable, and a fuzzy control apparatus, which is connected to the mill control apparatus and is designed to adjust the nominal variable of the at least one mill characteristic variable to be controlled, in the event of a discrepancy of at least one mill operating parameter from a predefined normal range, as a function of fuzzy rules, which are based on this at least one mill operating parameter, until the at least one mill operating parameter has once again reached the predefined normal range. The invention is also directed at a mill having a mill control system such as this, to the use of the mill and to a method for operating a mill, in particular a rolling mill.

BACKGROUND

Rolling mills have a rotating grinding plate and a plurality of rolling bodies which are pressed, for example via hydraulic cylinders, against the grinding plate. The grinding stock is passed centrally to the rotating grinding plate and is moved between the grinding plate and the rolling bodies to the grinding plate outer edge, by the centrifugal forces acting on it. There, it is blown away upward by a sifting air flow or primary air flow, and is transported to a sifter. Coarse particles are kept back in the sifter and are fed back to the grinding plate, while fine particles leave the mill or the sifter with the sifting air flow. In this case, the aim is to adjust the mill process such that a stable grinding stock layer (=grinding bed) is formed between the rotating plate and the rolling body, preventing direct contact between the rotating plate and the rolling body and ensuring that the mill runs smoothly.

FIG. 1 illustrates one mill control system for a rolling mill such as this, that is known from practice. The mill control system shown in FIG. 1 has a mill control apparatus 11 which comprises a mill load control unit 11*a*, a sifting air flow control unit 11*b*, a sifter temperature control unit 11*c*, a grinding pressure control unit 11*d* and a sifter rotation speed control unit 11*e*.

The load regulator 11*a* measures the mill load, for example in the form of the grinding stock mass flow supplied to a mill, compares the measured mill load with a mill load nominal variable, and then if necessary adjusts the allocator rotation speed. The sifting air flow control unit 11*b* measures the sifting air flow supplied to a mill 1, compares the measured sifting air flow with a sifting air flow nominal variable which is determined as a function of the instantaneous mill load, and then switches the sifting air hot-air control valve 15. The sifter temperature control unit 11*c* measures the temperature of the air flow leaving a sifter 7, compares the measured temperature with a temperature nominal variable which is determined as a function of the instantaneous mill load, and then switches the sifting air cold-air control valve 17. The grinding pressure control unit 11*d* measures the grinding pressure in the mill 1, compares the measured pressure with a grinding pressure nominal variable which is determined as a function of the instantaneous mill load, and then if necessary varies the contact pressure of the rolling bodies. Furthermore, it is possible to include the air pressure difference across the mill as a correction variable in the grinding pressure control process. The air pressure difference is the pressure difference between the mill inlet and mill outlet of the hot drying air flowing through the mill, including the carried-away fine dried coal dust particles and the water vaporized from the coal (exhaust vapors). If the pressure difference is high, then the amount of hot air contains a large amount of dust. If the difference is low, then there is less dust in the air. The extent of comminution, that is to say the amount of dust, can be influenced by means of the grinding pressure. Furthermore, the air pressure difference is also dependent on the mill load. The sifter rotation speed control unit 11*e* measures the rotation speed of the sifter 7, compares the measured rotation speed with a sifter rotation speed nominal variable which is determined as a function of the instantaneous mill load, and then if necessary varies the sifter rotation speed.

In certain circumstances, the mills have a tendency to "rumble", that is to say to run very roughly with vibration. This can be caused by different or changing operating conditions, for example caused by a change to a grinding stock with different grinding characteristics and/or wear of the grinding tools (rotating plate and rolling bodies) and/or by a change in the grinding stock quality. A change in the grinding stock or a change in the grinding stock quality can result in a change in the grinding bed thickness, which in some circumstances leads to mill rumbling.

DE 44 44 794 A1 discloses a mill control method in which the vibration level of the mill is recorded continuously by means of a vibration sensor, with the recorded values being used to form a long-term mean value and a short-term mean value, by means of which a first fuzzy logic function calculates a stability degree, and in which case a second fuzzy logic function calculates the nominal value of a control variable based on the calculated stability degree, in order to achieve a desired stability degree and to control the mill for optimum operation. A method according to DE 44 44 794 A1 therefore allows only control actions which can be derived from a long-term mean value.

SUMMARY

The invention is based on the object of providing a solution which makes it possible to ensure optimized mill operation, in particular mill operation avoiding "mill rumbling", automatically even in changing operating conditions.

The solution is also intended to allow the operating range of a mill, in particular a rolling mill, to be extended, the running time of the mill and of its components to be increased, and the energy consumption of the mill to be reduced.

The solution is also intended to allow the process of setting up a mill, in particular a rolling mill, to be simplified.

For this purpose, the invention provides a mill control system as claimed in claim 1, a mill as claimed in claim 14, the use of a mill as claimed in claim 17, and a method for operating a mill as claimed in claim 18. Preferred embodiments and developments of the mill control system according to the invention, of the mill according to the invention and of the method according to the invention are described in the respective dependent claims.

The invention makes it possible to largely automate the mill with the aid of specific fuzzy control, and to automatically ensure optimized mill operation. In particular, the invention allows the so-called "mill rumbling" during mill operation to be avoided. In this case, the air pressure difference across the mill represents the advantageous mill operating parameter which is kept in its predetermined normal range. This makes it possible to avoid the rumbling of the mill, since this control system allows the grinding bed thickness of grinding stock that occurs in the mill to be controlled and influenced, and to be kept and adjusted in a range in which no "mill rumbling" takes place. Furthermore, it is also possible to measure the thickness of the grinding stock layer between the grinding rollers and the grinding plate (grinding bed thickness), and to keep this in its predetermined normal range as a mill operating parameter.

The mill control system according to the invention has a mill control apparatus which controls at least one mill characteristic variable on the basis of an associated nominal variable, and has a fuzzy control apparatus which is connected thereto and complements the mill control apparatus. The fuzzy control apparatus may comprise the mill control apparatus, or else may be fitted to it. The fuzzy control apparatus can therefore, for example, simply be "fitted" restrospectively to an already existing mill control apparatus, thus allowing existing mills to be retrofitted with the fuzzy control apparatus, forming the mill control system according to the invention. The fuzzy control apparatus is designed to adjust the nominal variable of the at least one mill characteristic variable to be controlled, in the event of a discrepancy of at least one mill operating parameter from a predefined normal range, as a function of fuzzy rules which are based on this at least one mill operating parameter, until the at least one mill operating temperature has once again reached the predefined normal range. This results in the advantages that the avoidance of rough running (rumbling) makes it possible to achieve constant fine milling, a constant dust distribution between the individual dust lines, a constant mechanical load on the mill (in particular the load on the bearings), a constant low mill drive power, stable primary air flows and safe ignition at the downstream burner and a minimal amount of waste milling material, when the at least one mill operating parameter comprises at least the air pressure difference across the mill.

The mill control apparatus is designed to control at least one mill characteristic variable on the basis of an associated nominal variable. The mill control apparatus can therefore be designed to control at least one of the mill characteristic variables, or one of the mill operating parameters, sifting (sifter) air flow, sifter temperature, sifter separating grain size, mill load, grinding plate rotation speed, grinding pressure, grinding bed thickness or a combination of these or with these mill characteristic variables.

The predefined normal range of the at least one mill operating parameter is expediently determined as a function of the mill load. An absolute controlled variable is therefore available immediately, and not just a relative controlled variable, such as a comparison between a short-term mean value and a long-term mean value according to DE 44 44 794 A1.

It is also advantageous for the mill control apparatus to then control the at least one mill characteristic variable, preferably until there is a further discrepancy from the normal range, without any further action of the fuzzy control apparatus on the basis of the newly selected nominal variable. This means that the fuzzy control system actually intervenes only when an operating state which deviates from the normal state or normal range occurs in the mill.

In this case, it is advantageously possible that the mill control apparatus determines the associated nominal variable of the at least one mill characteristic variable to be controlled on the basis of another measured or recorded mill characteristic variable, wherein the other measured mill characteristic variable may, for example, be selected from the group which comprises the sifting air flow, the sifter temperature, the sifter separating grain size, the mill load, the grinding pressure, the air pressure difference across the mill, the grinding bed thickness as well as a characteristic variable which is derived/calculated from one or more of these mill characteristic variables, and combinations thereof. One refinement of the invention therefore provides for the mill control apparatus to determine the respective nominal variable, in particular the sifting (sifter) air flow, the sifter temperature, the sifter separating grain size, the grinding plate rotation speed and/or the grinding pressure as a function of the mill load.

The fuzzy control apparatus which is connected to the mill control apparatus or is fitted to it is designed to adjust the nominal variable of the at least one mill characteristic variable to be controlled, in the event of any discrepancy of at least one mill operating parameter from a predefined normal range, as a function of fuzzy rules, until the at least one mill operating parameter has once again reached the predefined normal range. Then, that is to say after the mill operating parameter resulting in the discrepancy has returned to the predefined range again, the mill control apparatus controls the at least one mill characteristic variable preferably without any further action of the fuzzy control apparatus, on the basis of the newly selected nominal variable, that is to say the mill control apparatus adopts the adjusted nominal variable as the new nominal variable. In other words, the nominal variable is adjusted in the long term or permanently by the fuzzy control apparatus. The fuzzy rules are based at least on the at least one mill operating parameter, and optionally on a plurality of mill operating parameters.

In other words, the nominal variable of the at least one mill characteristic variable to be controlled is adjusted and controlled by the fuzzy control apparatus on the basis of fuzzy rules and as a function of the at least one mill operating parameter, that is to say the mill control apparatus receives nominal variable control from the fuzzy control apparatus. In this case, according to one development of the invention, the nominal variable can be adjusted successively and/or by a specific increment per unit time. This is done until the fuzzy rule responsible for this no longer intervenes, that is to say until the at least one mill operating parameter has returned to the predefined normal range.

The fuzzy control apparatus may have a control block which links at least one fuzzy input variable to at least one fuzzy output variable via the fuzzy rules. The at least one fuzzy input variable comprises the at least one mill operating parameter, and the nominal variable of the at least one mill characteristic variable to be controlled is adjusted by means of the fuzzy output variable.

The at least one mill operating parameter comprises at least the air pressure difference across the mill. The predefined normal range may be determined, for example, as a function of the instantaneous mill load. A predefined characteristic can then be stored for this purpose, which reflects the course of an air pressure difference normal value as a function of the mill load. The normal range can then be determined using the air pressure difference normal value given for a specific mill load. It is also possible to vary, in particular to shift or to increase/reduce the gradient of, the predefined characteristic curve as a function of specific other variables. If the predefined normal range is determined as a function of the instantaneous mill load, it is possible to react quickly and efficiently to changes in the grinding characteristics of the grinding stock. The invention therefore also provides for the mill control apparatus to control the at least one mill characteristic variable to be controlled on the basis of a predetermined nominal value characteristic curve, with the fuzzy control apparatus being designed to alter the nominal value characteristic curve, in particular to shift it, as a function of the fuzzy rules.

According to one refinement of the invention, in addition to the air pressure difference across the mill, the at least one mill operating parameter may furthermore comprise a further mill characteristic variable and/or at least one grinding stock characteristic variable and/or at least one characteristic variable of an installation arranged downstream from the mill and assesses its grinding stock. In addition to the air pressure difference across the mill, the mill operating parameter may therefore furthermore comprise the sifting (sifter) air flow, the sifter temperature, the sifter separating grain size, the mill load, the grinding pressure, the grinding plate rotation speed, the electrical power of the mill (the power consumption of the mill), the grinding bed thickness, at least one grinding stock grinding characteristic (grindability, water content, etc.), the storage volume (the amount/the volume of the grinding stock stored in the mill), or at least one exhaust-gas concentration (for example the $NO_x$ emission), or an emission or the flame image of a burner arranged downstream from the mill, or a combination of these variables or with these variables.

The performance of the fuzzy control apparatus can be enhanced if the fuzzy rules are based on a plurality of mill operating parameters or on a plurality of fuzzy input variables. By way of example, it is possible in this case for the nominal variable of the at least one mill characteristic variable to be controlled to be adjusted as soon as one of the mill operating parameters deviates from its predefined normal range. Alternatively, it is possible for the nominal variable of the at least one mill characteristic variable to be controlled to be adjusted only when a plurality of the mill operating parameters deviate from their predefined normal range.

The invention is furthermore distinguished in that the at least one mill characteristic variable to be controlled comprises the sifter separating grain size and/or the grinding pressure, with the fuzzy control apparatus being designed to adjust the nominal variable of the sifter separating grain size and/or the nominal variable of the grinding pressure as a function of the air pressure difference across the mill and/or as a function of the grinding bed thickness, as well as at least one of the variables grinding pressure or sifter separating grain size.

Furthermore, it is advantageous for the fuzzy control apparatus also to be designed to determine another mill characteristic variable and/or a grinding stock characteristic variable as a function of at least one measured mill characteristic variable on the basis of fuzzy rules, as the invention likewise provides.

Furthermore, one particularly expedient development of the invention provides for the fuzzy control apparatus to be designed to determine the grindability of the grinding stock and/or a wear state, in particular the grinding tool wear state.

The mill control system according to the invention, or the method according to the invention, can be used to always operate the mill at its at least approximately optimum operating point and/or to regulate the mill at a new optimum operating point on leaving the optimum operating point (for example because of a change in the grinding stock or a change in the grinding stock quality). For example, the mill control system according to the invention can be used to prevent rumbling of the mill as a consequence of varying coal qualities, that is to say to ensure smooth mill running. Furthermore, the mill control system according to the invention makes it possible to lengthen the running time of the mill and of the mill components, and to reduce the energy consumption of the mill, since the mill always runs in its approximately optimum operating range/operating state, and the operating range of the mill can be extended, since the mill can be fed, for example, with grinding stocks of varying grinding stock quality. Furthermore, the mill control system according to the invention makes it possible to considerably simplify the process of starting up a mill, since the mill is automatically regulated at the optimum operating point by the mill control system, as a result of which there may be no need whatsoever for any setting-up engineer. Furthermore, the mill control system according to the invention can be used, for example on the basis of the need for readjustment, to identify whether certain parts of the mill have been subject to so much wear that they must be replaced soon.

If the fuzzy control apparatus fails, the mill can still be operated—even if not optimally—if required easily on a conventional basis.

The mill according to the invention has a mill control system according to the invention and can, for example, be used in a rolling mill, in particular a rolling bowl mill, wherein the mill can be designed for cement production, but in particular for grinding coal or cement, in particular cement clinker.

The invention therefore likewise provides for the mill to be used as a coal mill or a cement mill.

The method according to the invention for operating a mill is characterized by the same feature combination according to the invention as the mill control system according to the invention, as a result of which the same advantages can therefore be achieved as those with the mill control system.

One refinement of the method provides that the predefined normal range of the at least one mill operating parameter is determined as a function of the mill load, in which case, according to one development of the invention, it is then expedient to adjust the nominal variable successively and/or by a specific increment per unit time.

Finally, in one advantageous development of the method, the invention provides that the at least one mill characteristic variable is then controlled, preferably until there is a further discrepancy from the normal range, on the basis of the newly selected nominal variable.

BRIEF DESCRIPTION OF THE DRAWINGS

The invention will be explained in the following text using, by way of example, preferred embodiments and with reference to a drawing, in which.

DETAILED DESCRIPTION

Figure 1:
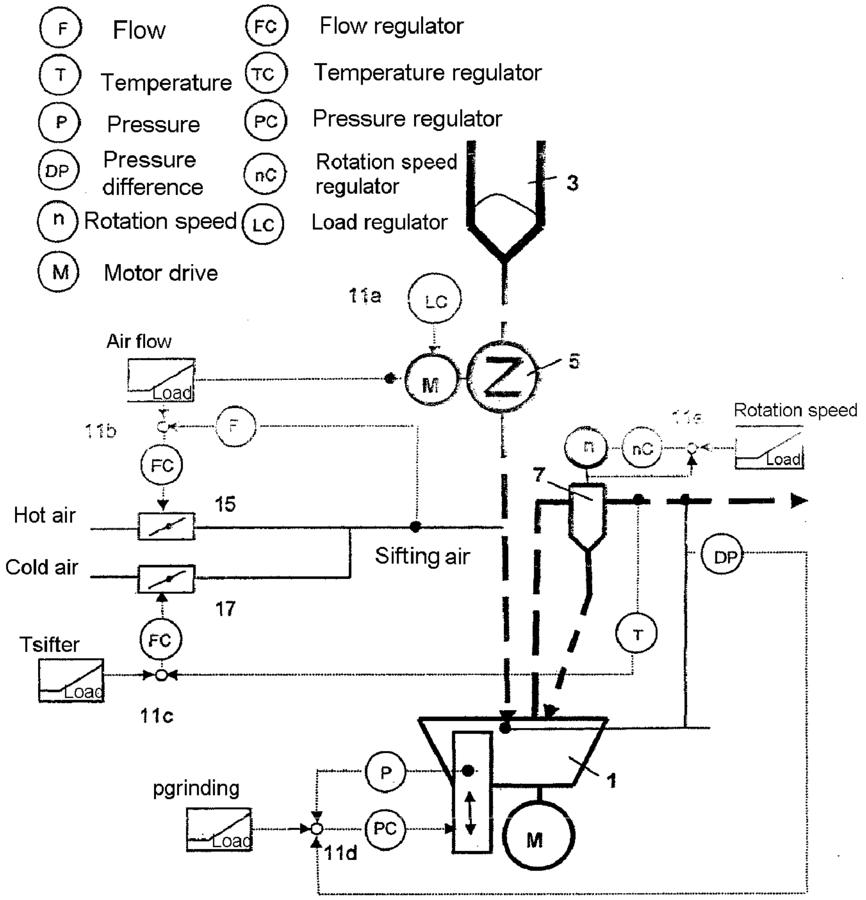
Fig. 1 Prior Art
FIG. 1. shows a flowchart of a conventional mill control system for a rolling mill, FIG. 2. shows a flowchart of a mill control system according to the invention, FIG. 3. shows the system structure of a fuzzy regulator which can be used in the mill control system shown in FIG. 2, FIG. 4. shows the control block of a fuzzy regulator of a mill control system as shown in FIG. 2, with a system structure as shown in FIG. 3, FIG. 5. shows the system structure of the fuzzy control apparatus for the mill control system shown in FIG. 2, FIG. 6. shows the control block for the fuzzy control apparatus shown in FIG. 5, FIG. 7 and FIG. 8. show the response of the fuzzy control apparatus as shown in FIGS. 5 and 6 to a deterioration in the coal quality, FIG. 9. shows an overview of the factors which influence mill rumbling, FIG. 10. shows an overview relating to the task of controlling the rate of load change, and FIG. 11. shows a control block for a fuzzy control apparatus for determining the Hardgrove index.
Figure 2:
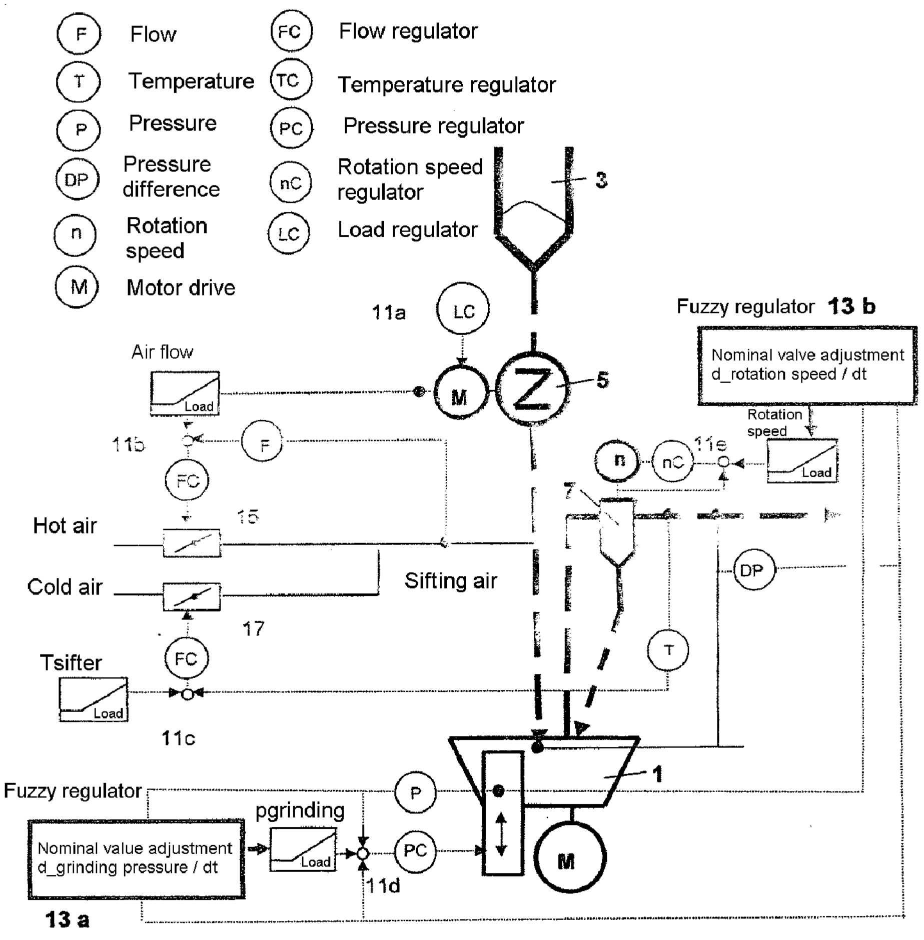

FIG. 2 shows a mill control system which is controlled by fuzzy regulators 13*a* and 13*b*, and in which identical elements to those in the conventional control system shown in FIG. 1 are provided with the same reference symbols. FIG. 2 shows a rolling mill 1. An allocator or mill feeder 5, for example in the form of a trough chain conveyor, plate belt allocator or belt conveyor, conveys a grinding stock, in the present case coal as a fuel to be comminuted, from a supply store or bunker 3 to the mill 1. The grinding stock feed in is carried out centrally to a rotating grinding plate of the rolling mill. The rolling mill is a rolling bowl mill. According to the centrifugal forces, the grinding stock is moved toward the grinding plate outer edge and therefore through between the rotating plate and the rolling body, thus comminuting it. The ground grinding stock is then entrained completely with coarse and fine components, by a sifting air flow at the plate outer edge, and is transported to a sifter 7. The sifter 7 may be in the form of a sifter within or outside the mill. Coarse particles are held back in the sifter 7, and are fed back to the rolling mill 1 or the grinding plate. Fine particles leave the mill 1 or the sifter 7 with the sifting air flow and are passed to a downstream installation, which is not illustrated. By way of example, this may be a silo or else directly a burner of a combustion chamber, fired by coal dust, of a large power station.

According to the embodiment illustrated in FIG. 2, the mill control system has a mill control apparatus 11 and a fuzzy control apparatus 13.

The mill control apparatus 11 is designed to control the following mill characteristic variables on the basis of a respectively associated nominal variable:

mill load or allocator feed rate
sifting (sifter) air flow
sifter temperature
grinding pressure and
sifter separating grain size.

For this purpose, the mill control apparatus 11 has a mill load control unit 11*a*, a sifting air flow control unit 11*b*, a sifter temperature control unit 11*c*, a grinding pressure control unit 11*d* and a sifter separating grain size control unit 11*e*.

In the present case, the sifter separating grain size is set via the sifter rotation speed. Alternatively, the sifter separating grain size may, however, also be set, for example, by adjusting the sifter valve and/or baffle plates.

As already described initially with reference to FIG. 1, the sifting air flow control unit 11*b* measures the sifting air flow fed into the mill 1, compares the measured sifting air flow with a sifting air flow nominal variable which is determined as a function of the instantaneous mill load, and then switches a sifting air hot-air control valve 15. The sifter temperature control unit 11*c* measures the temperature of the flow leaving the sifter 7 (sifting air flow and fine grinding), compares the measured temperature with a temperature nominal variable which is determined as a function of the instantaneous mill load, and then switches a sifting air cold-air control valve 17. The grinding pressure control unit 11*d* measures the grinding pressure (or the grinding force), compares the measured pressure with a grinding pressure nominal variable which is determined as a function of the instantaneous mill load, and then if necessary changes the contact pressure of the rolling bodies. Furthermore, the pressure difference across the mill (=difference between the air pressure upstream of the mill and the air pressure downstream from the mill) can be included as a correction variable in the grinding force control or grinding pressure control. The sifter rotation speed control unit 11*e* measures the rotation speed of the sifter 7, compares the measured rotation speed with a sifter rotation speed nominal variable which is determined as a function of the instantaneous mill load, and then varies the sifter rotation speed if necessary. The load regulator 11*a* measures the coal mass flow supplied to the mill, compares the measured mass flow with a mass flow nominal variable, and then if necessary adjusts the allocator rotation speed. The mass flow nominal value may, for example, be determined and/or adjusted as a function of a characteristic variable of an installation arranged downstream from the mill, for example as a function of the boiler load or amount of steam of a steam boiler device arranged downstream from the mill.

As shown in FIG. 2, the respective nominal variable of the sifting air flow, the sifter temperature, the sifter rotation speed and the grinding pressure is determined as a function of the mill load, with the nominal variables being stored in the form of nominal value curves/nominal variable curves.

The fuzzy control apparatus 13 has a first fuzzy control unit 13*a* and a second fuzzy control unit 13*b*.

The first fuzzy control unit 13*a* is connected to the meal pressure control unit 11*d* of the mill control apparatus 11 and communicates with it, and the second fuzzy control unit 13*b* is connected to the sifter rotation speed control unit 11*e* of the mill control apparatus 11 and communicates with it.

In other words, the first fuzzy control unit 13*a* is fitted to the meal pressure control unit 11*d*, and the second fuzzy control unit 13*b* is fitted to the sifter rotation speed control unit 11*e*, that is to say the control units 11*d* and 11*e* are complemented by the respectively associated fuzzy control unit 13*a* or 13*b*.

The first fuzzy control unit 13*a* is designed to control the grinding pressure nominal variable, that is to say to adjust or set it on the basis of fuzzy rules, as a function of at least one mill operating parameter.

The second fuzzy control unit 13*b* is designed analogously to control the sifter rotation speed nominal variable or the sifter separating grain size nominal variable as a function of at least one mill operating parameter.

In addition to the air pressure difference across the mill, one or more of the following characteristic variables, for example, may be selected as a mill operating parameter:

sifting air flow, sifter temperature, sifter separating grain size or sifter rotation speed, mill load, grinding pressure, grinding bed thickness, grinding stock grinding characteristic (for example Hardgrove index), storage volume and/or $NO_x$ emission or flame image of a burner arranged downstream from the mill.

According to the embodiment illustrated in FIG. 2, the fuzzy control apparatus 13 is designed to adjust the nominal variable of the sifter separating grain size and the nominal variable of the grinding pressure in each case as a function of the air pressure difference across the mill, the grinding pressure and the sifter rotation speed, as is indicated by the dashed lines in FIG. 2.

The air pressure difference across the mill is defined as the pressure difference between the mill inlet and the mill outlet/sifter outlet of the hot drying air flowing through the mill, including the fine dried coal dust particles carried away, and the water vaporized from the coal (exhaust vapors). If the pressure difference is high, the drying air has a large amount of dust in it (that is to say the solid circulation in the mill is high); if the pressure difference is low, the amount of dust in it is low (that is to say the solid circulation in the mill is low). The grinding stock comminution and therefore the amount of dust (the solid circulating in the mill) can be influenced by the grinding pressure.

If the nominal variables for the sifter rotation speed and the grinding pressure are stored in the form of nominal value curves, it is possible, for example, that the fuzzy control apparatus 13 is equipped to vary, in particular to shift, the respective nominal value curve on the basis of the fuzzy rules.

Figure 3:
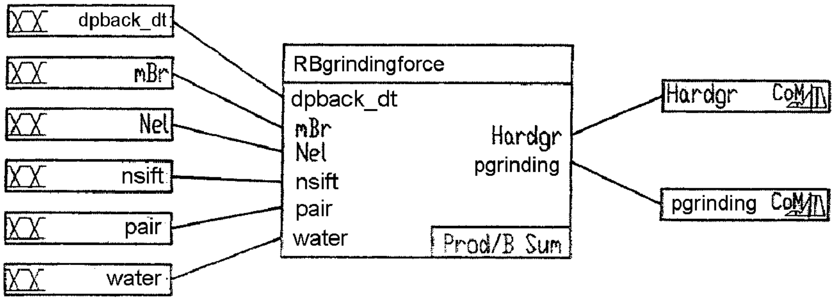

The system structure of a fuzzy regulator or of a fuzzy control unit will be described in the following with reference to FIG. 3, wherein FIG. 3 shows a demonstration example and is used to explain a fuzzy regulator which can be used in a mill control system as shown in FIG. 2.

The system structure describes the data flow in the fuzzy system. Input interfaces fuzzify the input variable or variables. In this case, by way of example, the time rate of change of the backpressure, the fuel mass flow, the electrical power of the mill, the sifter rotation speed, the air pressure upstream of the mill and the water content of the grinding stock/of the coal are selected from the grinding drying computation as input variables. In this case, analog values are converted to association degrees. The fuzzification process is followed by the fuzzy inference. In this case, one or more output variables described linguistically (in this case: grinding pressure and Hardgrove index of the coal) are defined by the input variables by means of "when-then" rules (=fuzzy rules) which are defined in one or more control blocks (cf. FIG. 4). These output variables are then converted to analog values by means of defuzzification in the output interfaces, that is to say digital values on an installation basis are obtained from the linguistic variables in the defuzzification process.

FIG. 4 shows one example of a control block of the fuzzy regulator with the system structure shown in FIG. 3. The behavior of the regulator in the various process situations is defined by the control block. The control block contains rules for a fixed set of input and output variables. The "when" part of each rule describes the situation in which the respective rule is intended to apply or be applied (in other words the precondition or preconditions/premise or premises), and the "then" part defines the reaction of the regulator to the respective process situation (in other words the consequence or consequences). A different weight can be assigned to the individual rules by the "Degree of Support" (DOS). By way of example, the rules may be specified by the mill manufacturer, with the number of rules being defined depending on the respective requirement. The software program has corresponding input options.

A fuzzy regulator provided with the system structure shown in FIG. 3 and the control block shown in FIG. 4 is equipped to determine the grinding pressure and the Hardgrove index of the coal as a function of the input variables mentioned above, and to be used if desired in the mill control system shown in FIG. 2.

Figure 5:
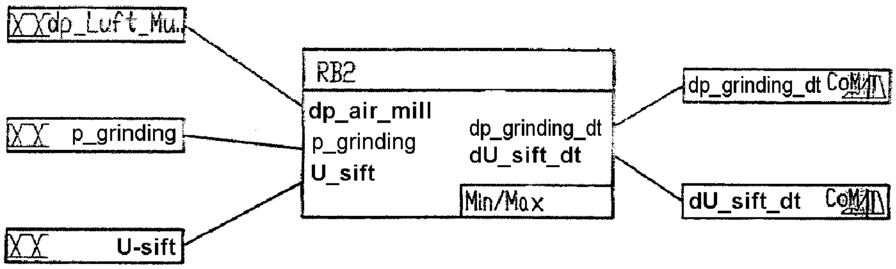

For the present exemplary embodiment, FIG. 5 shows the system structure of the fuzzy control apparatus 13 of the mill control system shown in FIG. 2, and FIG. 6 shows the control block of the fuzzy control apparatus 13 shown in FIG. 5, wherein separate control blocks can alternatively be formed for the grinding pressure control and the sifter rotation speed control.

As is shown in FIG. 5, the premises contain the input variables (the fuzzy input variables correspond to or comprise the mill operating parameters) (WHEN . . . )

air pressure difference across the mill dp_air_mill
grinding pressure p_grinding and
sifter rotation speed U_sift, wherein the consequences (THEN . . . ) are associated with the variables
change in the meal pressure nominal variable dp_meal_dt and
change in the sifter rotation speed nominal variable dU_sift_dt and wherein in general:

WHEN "premise 1" AND "premise 2" AND "premise 3" THEN "consequence 1" and "consequence 2".

The number of rules shown in FIG. 6 represents an example and can be changed in a simple manner, wherein by the illustrated number of rules, as will be shown in the following, a considerable improvement in the mill operation can be achieved. In particular, the grinding bed thickness can be taken into account as an additional operating parameter. The fuzzy control apparatus 13 illustrated in FIGS. 5 and 6 can be used for all rolling mills, in particular rolling bowl mills, and for any type of grinding stock ground therein. In general, there is no need for individual matching, with the exception of the normal ranges of the fuzzy regulator as defined above.

Figure 7:
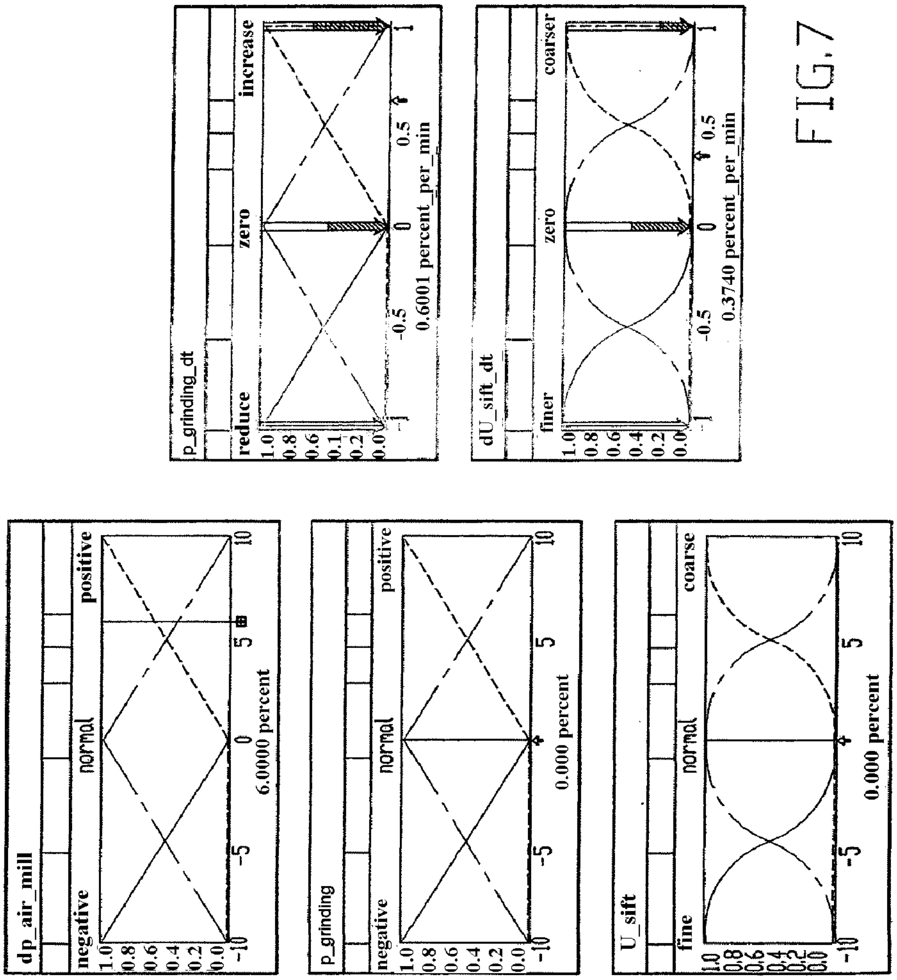
Figure 8:
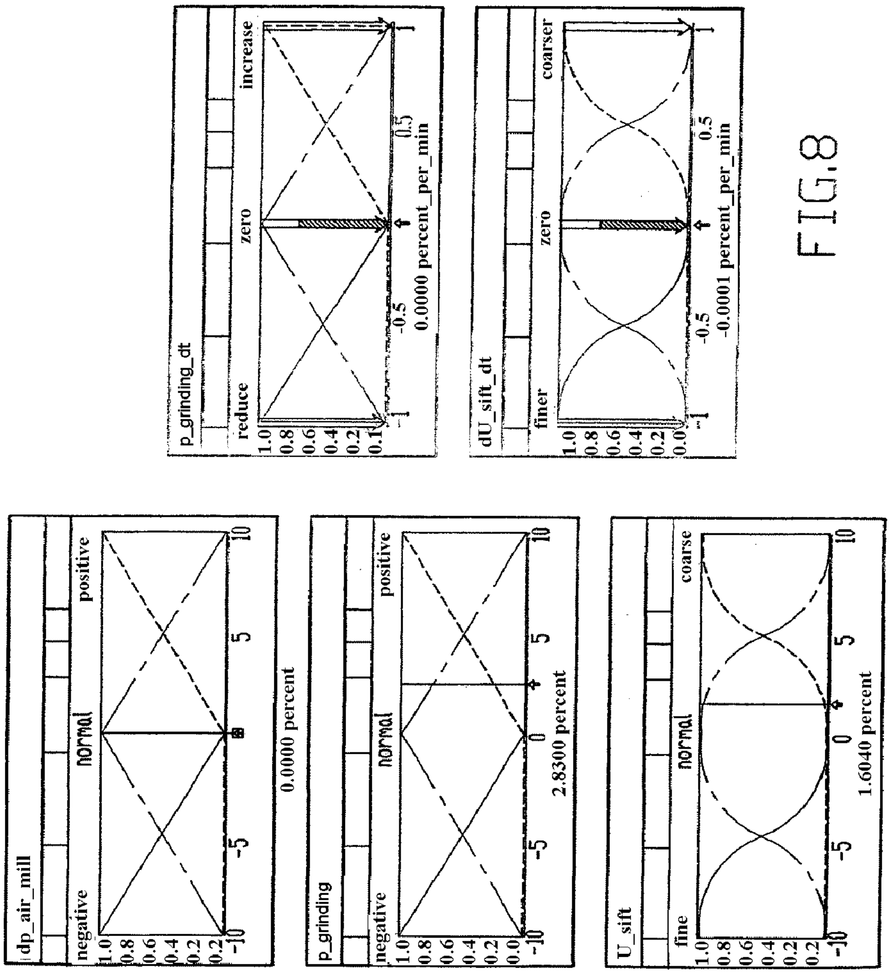

The fuzzy control apparatus 13 can be used to influence the grinding bed thickness and therefore prevent possible "rumbling" of the mill. For example, if the grindability of the coal deteriorates (Hardgrove number/Hardgrove index decreases, water content rises), then this leads to a considerable amount of small coal being fed back (=coarse material fed back from the sifter to the grinding plate), as a result of which the air pressure difference across the mill rises considerably above the standard value associated with or allocated to the present mill load point (for example by 6% as shown in FIG. 7), and leaves a predefined normal range (in this case plus/minus 5%). As shown in FIG. 6 (see rule 17) and FIG. 7, the fuzzy control apparatus 13 now acts in such a way that a new mill operating point is found by raising the grinding pressure nominal value (for example by 0.6%/minute as shown in FIG. 7) and by reducing the sifter rotation speed nominal value (for example by 0.37%/minute as shown in FIG. 7), wherein a reduction in the sifter rotation speed corresponds to an increase in the separating grain size, that is to say coarser particles pass through the sifter 7. As can be seen from FIG. 8, the air pressure loss across the mill has oscillated back again to its normal value after a certain time, wherein the new grinding pressure nominal variable is 2.83% higher than the normal nominal variable associated with the present load (=nominal variable predetermined by the mill control apparatus), and wherein the new sifter rotation speed nominal variable is moved or shifted about 1.6% in the coarser direction, in comparison to the normal nominal variable associated with the present load. The new nominal variables and, accordingly, the new operating point result from the current coal quality and are automatically found for each coal. If the coal quality then remains constant, rule 14 is satisfied in the further mill operation (see FIG. 6), as a result of which the fuzzy control apparatus 13 does not intervene, and does not need to intervene, in the grinding process any further.

When the load is constant, the fuzzy control apparatus 13 raises the nominal variable for the grinding pressure (and/or the nominal variable for the sifter separating grain size) when the air pressure difference across the mill rises or deviates from the normal range, by a specific increment per unit time, thus achieving better milling and a smaller amount of small coal being fed back, until the rule which is responsible for this no longer acts, that is to say the air pressure difference across the mill is in the normal range again.

The described fuzzy control apparatus 13 covers a very wide range of coal or grinding stock completely automatically, that is to say without any requirement for external action. Changing operating conditions, for example caused by wear of the grinding tools, are likewise compensated for or regulated out without any problems. The milling operation mode is therefore positively influenced and the "rumbling" no longer occurs. The milling operation mode is optimized and the grinding fineness is adapted largely with regard to the rumbling and/or the rate of load change, which is likewise dependent on the grinding bed thickness. The installation-optimum variation of the grinding pressure nominal value and of the sifter rotation speed nominal value can be adapted and respectively can be set, and the grinding fineness therefore can be influenced, by varying the weight coefficients (DOS values). Furthermore, the improved control mode makes it possible to achieve a performance improvement of the mill. If one or both of the fuzzy control units 13*a*, 13*b* fail, the mill can still be operated easily in the conventional manner—even if not optimally. During the development phase of the fuzzy control apparatus 13 and respectively after it has been fitted to the mill control apparatus 11, it is possible first of all only to observe the mode of the fuzzy control apparatus 13 and to allow the grinding process first of all to continue to run simply controlled by the mill control apparatus 11, in order to subsequently approve the nominal value control.

Figure 9:
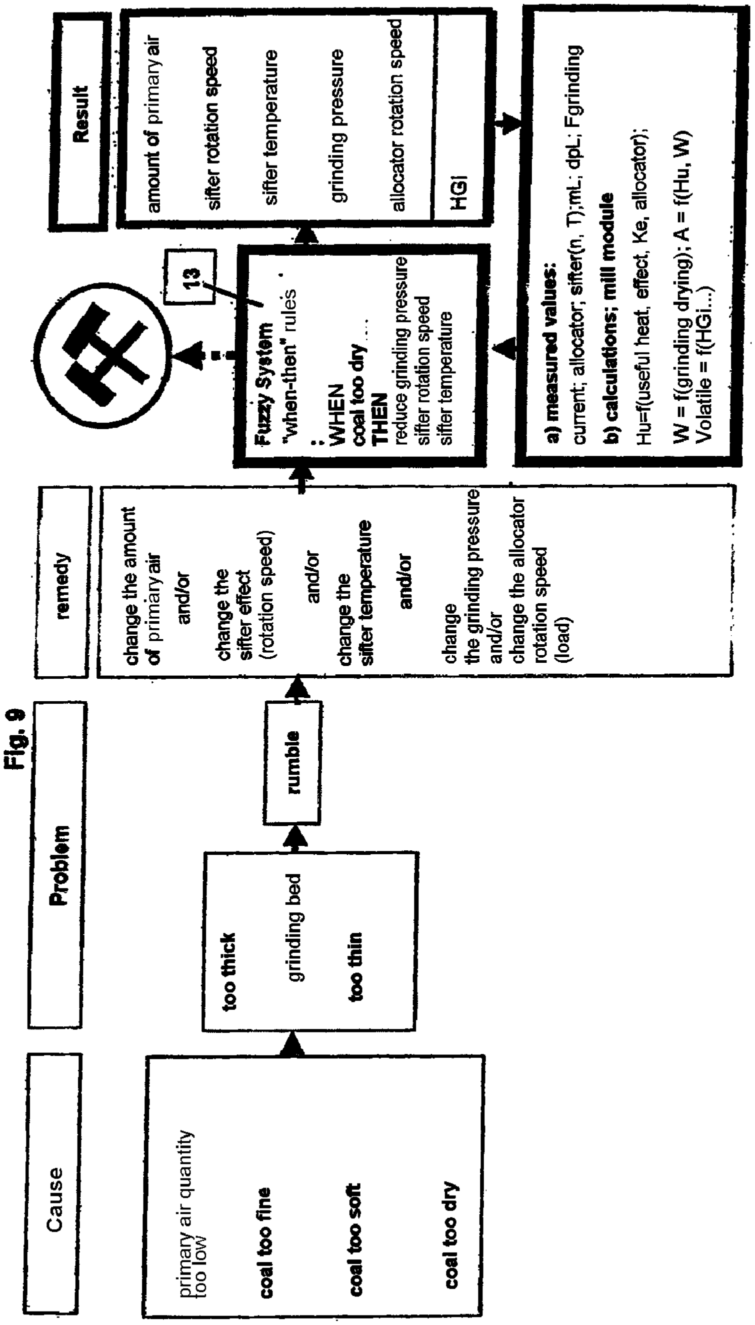

FIG. 9 shows an overview, in the form of a graph, showing how to avoid mill rumbling with the aid of a fuzzy control apparatus 13 used according to the invention. The rumbling may be caused not only by a change in the grinding stock quality but, for example, by an excessively small amount of primary air, thus resulting in a rise in the grinding bed thickness. As is illustrated in FIG. 9, the mill rumbling can be avoided according to the invention by fitting a fuzzy control unit to at least one (for example to a plurality) of the control units 11*a*-11*e*, in order to control the nominal variable of at least one of the mill characteristic variables listed under "remedy", by means of the fuzzy control apparatus 13. By way of example, FIG. 9 shows a fuzzy control apparatus 13 which in each case provides nominal value control for grinding pressure control, sifter rotation speed control and sifter temperature control. The fuzzy control apparatus 13 shown in FIG. 9 includes one and only one further input variable in addition to the air pressure difference across the mill (not shown), specifically the degree of dryness of the grinding stock and respectively of the coal. Alternatively, the fuzzy control apparatus 13 illustrated in FIG. 9 may, however, also comprise further input variables, for example further grinding stock characteristic variables and/or one of the mill characteristic variables listed under "remedy" and/or further mill characteristic variables and/or a characteristic variable of an installation arranged downstream from the mill and assesses its grinding stock, such as exhaust-gas concentrations or emissions, or the flame image of a downstream burner. If the fuzzy control apparatus 13 has a plurality of input variables, then the grinding process can be optimally controlled more easily by sensible and rule-based linking of the various variables, for example in order to avoid mill rumbling. As can also be seen from FIG. 9, the fuzzy control apparatus 13 may be provided not only with the measured values (such as the current consumption by the mill "current", allocator rotation speed "allocator", sifter temperature and sifter rotation speed "sifter (n, T)", amount of primary air and respectively sifting air flow "mL", air pressure difference across the mill "dpL" and grinding pressure or grinding force "$F_{meal}$"), but also values calculated by a mill module (such as the calorific value "HU", water content of the coal "W", ash "A", volatile) for example as mill operating parameters/fuzzy input variables. As indicated under "result" in FIG. 9, it is possible, for example, to provide for the fuzzy control apparatus 13 to draw conclusions about the coal that is currently available on the basis of the actions taken, that is to say determine/estimate the grindability HGI (Hardgrove index) of the coal.

Figure 10:
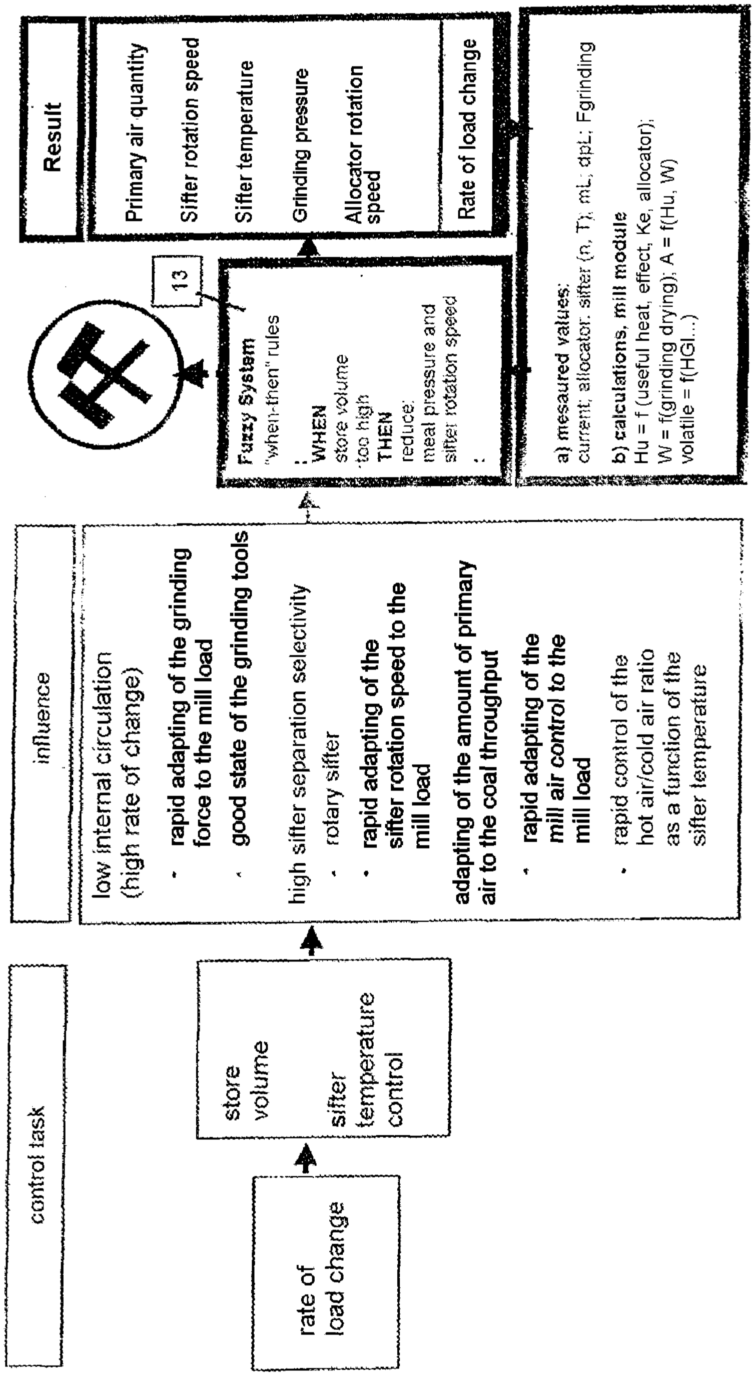

FIG. 10 shows an overview of the control task relating to the rate of load change and the sifter temperature control. The rate of load change is dependent on the grinding bed thickness. It can be expected that the permissible rate of load change can be predicted by fuzzy-stabilized control. The aim of the control process is to use appropriate nominal value presets to achieve a specific level for the grinding pressure and the sifter rotation speed, depending on the respective grinding characteristics of the fuel. In the end, these above-mentioned values influence the grinding bed thickness and therefore the input or output storage properties of the mill. A further fuzzy block can be formulated for the rate of load change, in which this variable is positively influenced by the nominal values of the grinding pressure and the sifter rotation speed. In this case, the existing rate of load change can be included as further measured value in the fuzzy control block. The corresponding fuzzy control mechanism has additional rules added to it, as appropriate. The grinding pressure and the sifter adjustment are therefore used to influence the grinding bed, not only with regard to "rumbling" but also with regard to the maximum permissible rate of load change. If the actions for nominal value adjustment of the grinding pressure and of the sifter are inadequate, the mill load can be influenced as the nominal value.

According to a further embodiment of the invention, the fuzzy control apparatus 13 may additionally be designed to determine another mill characteristic variable and/or grinding stock characteristic variable as a function of at least one measured mill characteristic variable. For example, as is shown in FIG. 11, the fuzzy control apparatus 13 may be equipped to determine the grindability of the grinding stock and respectively the Hardgrove index HGI as a function of the grinding pressure, the air pressure difference across the mill and the sifter rotation speed, using fuzzy rules. In other words, it may be sufficient for determining the grindability HGI, to track the premises listed in FIG. 11 during operation of the mill, in order to derive from this the grindability. Alternatively or additionally, the fuzzy control apparatus 13 may be equipped to determine and/or to predict the grinding tool wear. For example, the mean change in the grinding rolling piston height with respect to time, determined from measured values, can be compared with the Hardgrove number and/or ash coal characteristics determined using a mill module or the fuzzy control apparatus 13, in order to predict the wear developing on the basis of these variables.

Although the invention has been explained above with reference to one exemplary embodiment, based on the grinding of coal, the mill control process can be used for all types of rolling mills as well as any grinding stock which can be milled in this way, for example cement clinker.

The invention claimed is:

1. A mill control system for a coal mill, said mill control system comprising: a mill control apparatus for controlling mill characteristic variables including grinding pressure and sifter rotation speed, the mill control apparatus including a grinding pressure control unit that controls the grinding pressure of grinding rolls in response to mill load, and a sifter rotation speed control unit that controls sifter rotation speed in response to the mill load, and a device for detecting an air pressure difference between air pressure upstream of the mill and air pressure downstream from the mill, a fuzzy control apparatus connected to the mill control apparatus, the fuzzy control apparatus being configured for controlling nominal variables of the mill characteristic variables, the fuzzy control apparatus having a first fuzzy control unit that controls a grinding pressure nominal variable, and a second fuzzy control unit that controls a sifter rotation speed nominal variable, wherein the fuzzy control apparatus is designed to adjust the nominal variables of the mill characteristic variables, including the grinding pressure and sifting rotation speed, to be controlled, in the event of a discrepancy between a mill operating parameter and a predefined normal range corresponding to the mill load, the mill operating parameter being an air pressure difference between the air pressure upstream of the mill and the air pressure downstream of the mill, said fuzzy control apparatus being configured to adjust said nominal variables as a function of fuzzy rules that are based on the mill operating parameter until the mill operating parameter has reached the predefined normal range again wherein the mill control apparatus adopts the adjusted nominal variables of said mill characteristic variables as the new nominal variables and then controls said mill characteristic variables on the basis of the newly selected nominal values.

2. The mill control system as claimed in claim 1, wherein the fuzzy control apparatus is configured to adjust the nominal variables successively.

3. The mill control system as claimed in claim 1, wherein the fuzzy control apparatus is configured to adjust the nominal control variables by a specific increment per time unit.

4. The mill control system as claimed in claim 1, wherein the mill control apparatus is configured to control the mill characteristic variables until there is a further discrepancy from the normal range, without any further action of the fuzzy control apparatus on the basis of the newly adjusted nominal variables.

5. The mill control system as claimed in claim 1, wherein the mill control apparatus is configured to control a mill characteristic variable on the basis of a predetermined nominal value characteristic curve, the fuzzy control apparatus being designed to alter the nominal value characteristic curve as a function of the fuzzy rules.

6. The mill control system as claimed in claim 1, wherein the fuzzy control apparatus is furthermore designed to determine at least one of another mill characteristic variable and a grinding stock characteristic variable as a function of at least one measured mill characteristic variable on the basis of fuzzy rules.

7. The mill control system as claimed in claim 1, wherein, to avoid a rumbling of the coal mill, the fuzzy control apparatus is designed to determine at least one of a grindability of grinding stock, a wear state, and a grinding tool wear state.

8. The mill control system as claimed in claim 1, wherein the fuzzy control apparatus is designed to control on the basis of additional mill operating parameters, said additional mill operating parameters being selected from a group consisting of the sifting air flow, the sifter temperature, the sifter separating grain size, the mill load, the grinding pressure, the grinding plate rotation speed, the electrical power of the mill, the grinding bed thickness, at least one grinding stock grinding characteristic, the storage volume, at least one exhaust-gas concentration, at least one exhaust-gas emission, the flame image of a burner arranged downstream from the mill, and combinations thereof.

9. The mill control system as claimed in claim 1, wherein the mill control apparatus is configured to control a mill characteristic variable selected from the group consisting of the sifting air flow, the sifter temperature, the sifter separating grain size, the mill load, the grinding plate rotation speed, the grinding pressure, the grinding bed thickness and combinations thereof.

10. A coal mill comprising a mill control system as claimed in claim 1.

11. A rolling mill comprising a mill control system as claimed in claim 1.

12. A bowl mill crusher comprising a mill control system as claimed in claim 1.

13. The coal mill as claimed in claim 10, further comprising a combustion chamber of a power plant arranged downstream from the mill control system, said combustion chamber being configured to be fired with coal dust.

14. A method for operating a coal mill, said method comprising using a mill control apparatus for controlling mill characteristic variables, including sifter rotation speed and grinding pressure, wherein controlling mill characteristic variables includes controlling grinding pressure of grinding rolls in response to mill load, and controlling the sifter rotation speed in response to the mill load, and detecting an air pressure difference between air pressure upstream of the mill and air pressure downstream from the mill, using a fuzzy control apparatus connected to the mill control apparatus for controlling nominal variables, including controlling a grinding pressure nominal variable, and a sifter rotation speed nominal variable, adjusting said nominal variables in response to a discrepancy between a mill operating parameter and a predefined normal range that corresponds to the mill load, said mill operating parameter being an air pressure difference between air pressure upstream of the mill and air pressure downstream from the mill, wherein adjusting comprises adjusting the nominal variables as a function of fuzzy rules that are based on the mill operating parameter until the mill operating parameter has reached the predefined normal range again, wherein the mill control apparatus adopts the adjusted nominal variables of said mill characteristic variables as the new nominal variables and then controls said mill characteristic variables on the basis of the newly-selected nominal values.

15. The method as claimed in claim 14, wherein adjusting the nominal variables comprises adjusting the nominal variables successively.

16. The method of claim 14, wherein adjusting the nominal variables comprises adjusting the nominal variables by a specific increment per time unit.

17. The method as claimed in claim 14, further comprising controlling the at least one mill characteristic variable on the basis of the newly adjusted nominal variable.

18. The method as claimed in claim 14, further comprising controlling at least one mill characteristic variable until there is a further discrepancy from the normal range.

19. The mill control apparatus as claimed in claim 1, wherein the mill control apparatus is configured to control the mill characteristic variables on the basis of predetermined nominal value characteristic curves, and wherein the fuzzy control apparatus is configured to alter the nominal characteristic curves as a function of the fuzzy rules.

20. The mill control apparatus as claimed in claim 19, wherein the fuzzy control apparatus is configured to alter the nominal characteristic curves by shifting the nominal value characteristic curves as a function of the fuzzy rules.

21. The method as claimed in claim 13, wherein the mill control apparatus controls the mill characteristic variables on the basis of predetermined nominal value characteristic curves, and wherein the fuzzy control apparatus is configured to alter the nominal value characteristic curves as a function of the fuzzy rules.

22. The method as claimed in claim 21, wherein the fuzzy control apparatus is configured to alter the nominal value characteristic curves by shifting the nominal characteristic curves.

* * * * *